United States Patent [19]
Imlach

[11] Patent Number: 5,894,181
[45] Date of Patent: Apr. 13, 1999

[54] PASSIVE MAGNETIC BEARING SYSTEM

[76] Inventor: Joseph Imlach, 460 Falke Ct., Anchorage, Ak. 99504

[21] Appl. No.: 08/896,580

[22] Filed: Jul. 18, 1997

[51] Int. Cl.$^6$ ............................................. H02K 7/09
[52] U.S. Cl. ................................................ 310/90.5
[58] Field of Search .................................. 310/90.5

[56] References Cited

U.S. PATENT DOCUMENTS

| | | | |
|---|---|---|---|
| 3,326,610 | 6/1967 | Baermann | 310/90.5 |
| 4,128,280 | 12/1978 | Purtschert | 310/90.5 |
| 4,471,331 | 9/1984 | Wyatt | 310/90.5 |
| 5,017,819 | 5/1991 | Patt et al. | 310/90.5 |
| 5,043,615 | 8/1991 | Oshima | 310/90.5 |
| 5,225,728 | 7/1993 | Oshima | 310/90.5 |
| 5,521,448 | 5/1996 | Tecza et al. | 310/90.5 |
| 5,619,083 | 4/1997 | Dunfield et al. | 310/90.5 |
| 5,686,772 | 11/1997 | Delamare et al. | 310/90.5 |

FOREIGN PATENT DOCUMENTS

| | | | |
|---|---|---|---|
| 57-97917 | 6/1982 | Japan | 310/90.5 |
| 57-97919 | 6/1982 | Japan | 310/90.5 |
| 61-218827 | 9/1986 | Japan | 310/90.5 |
| 2-93120 | 4/1990 | Japan | 310/90.5 |

*Primary Examiner*—Clayton LaBalle
*Attorney, Agent, or Firm*—Michael J. Tavella

[57] ABSTRACT

A passive magnetic bearing suspension system for rotatable or translatable applications. Such bearings systems contain subsystems acting in mutually perpendicular directions to produce an overall system that is statically and dynamically stable. Further, these bearings can be constructed entirely of ring, disk, and/or bar-shaped magnets that are axially magnetized. This reduces the manufacturing difficulties associated with previous systems that required conical magnets and/or radial magnetization.

12 Claims, 11 Drawing Sheets

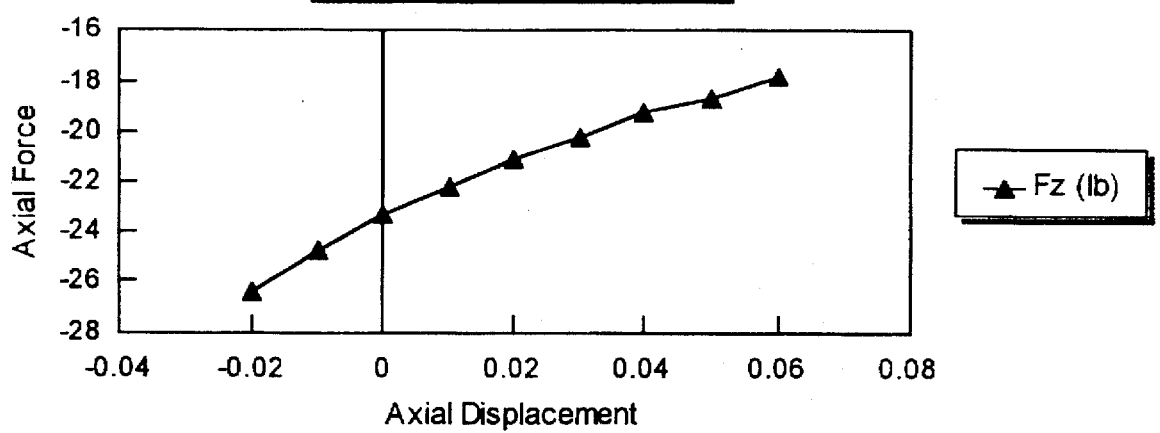

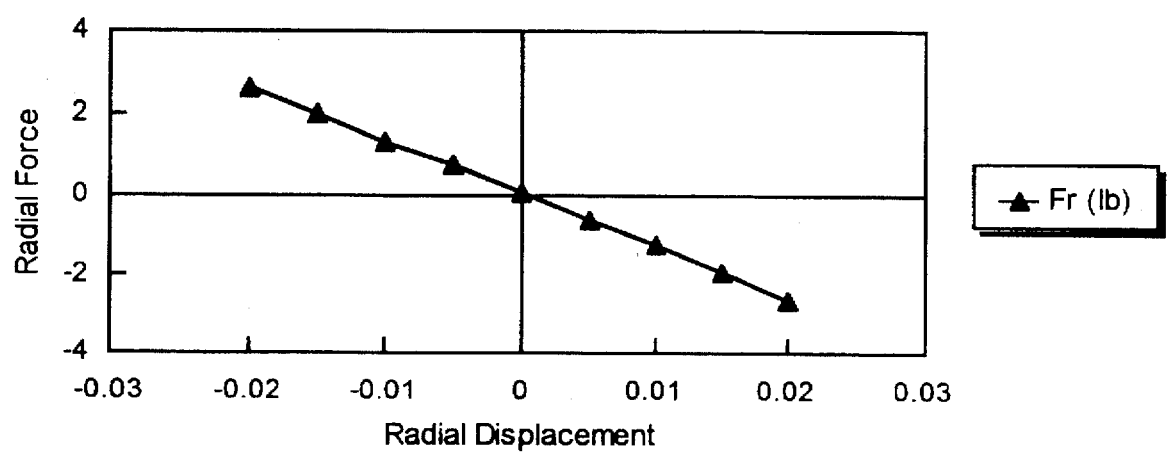

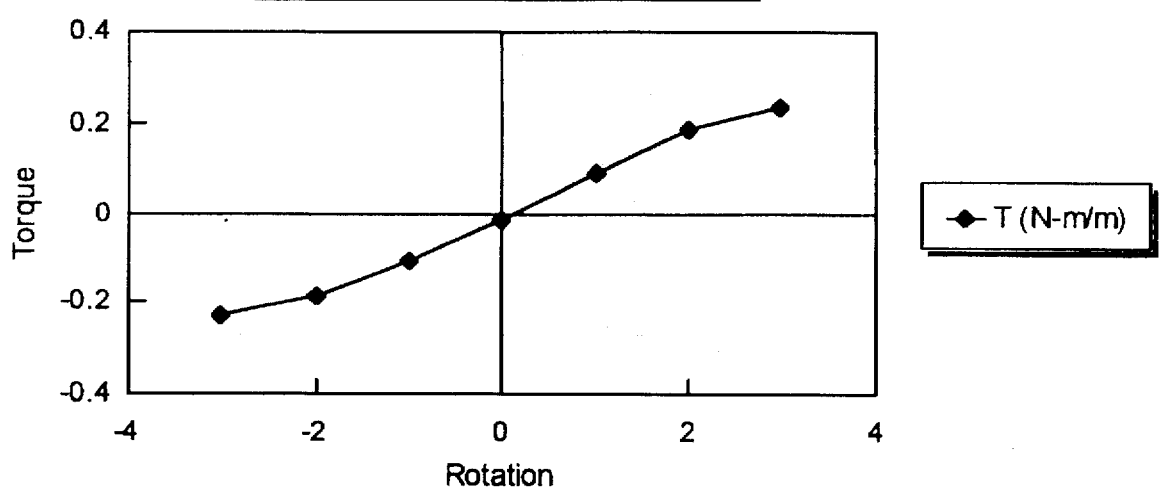

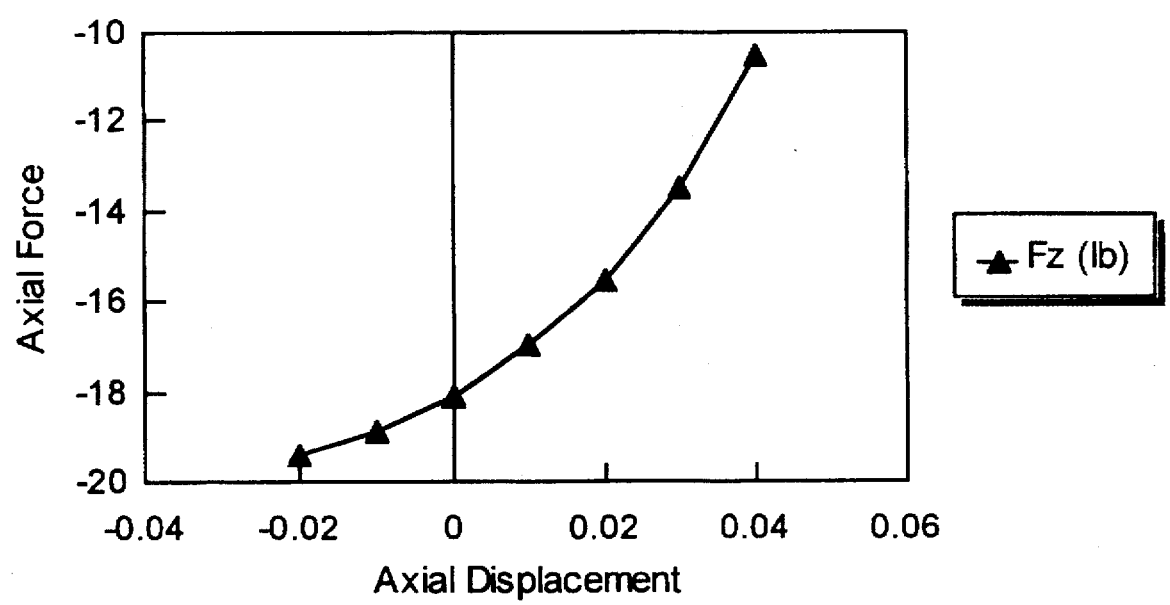

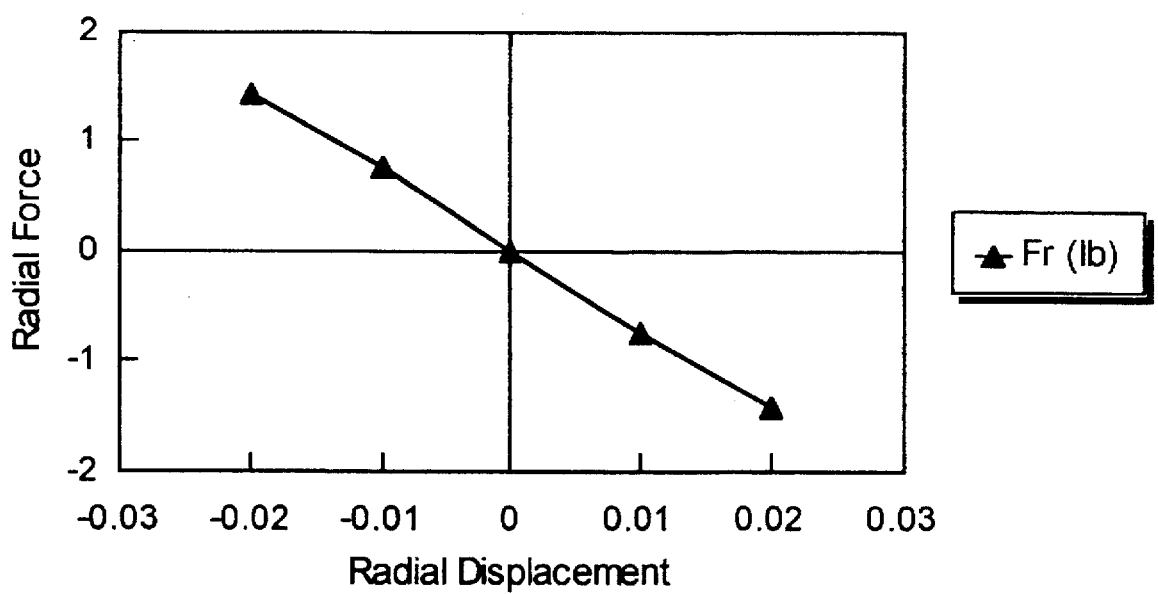

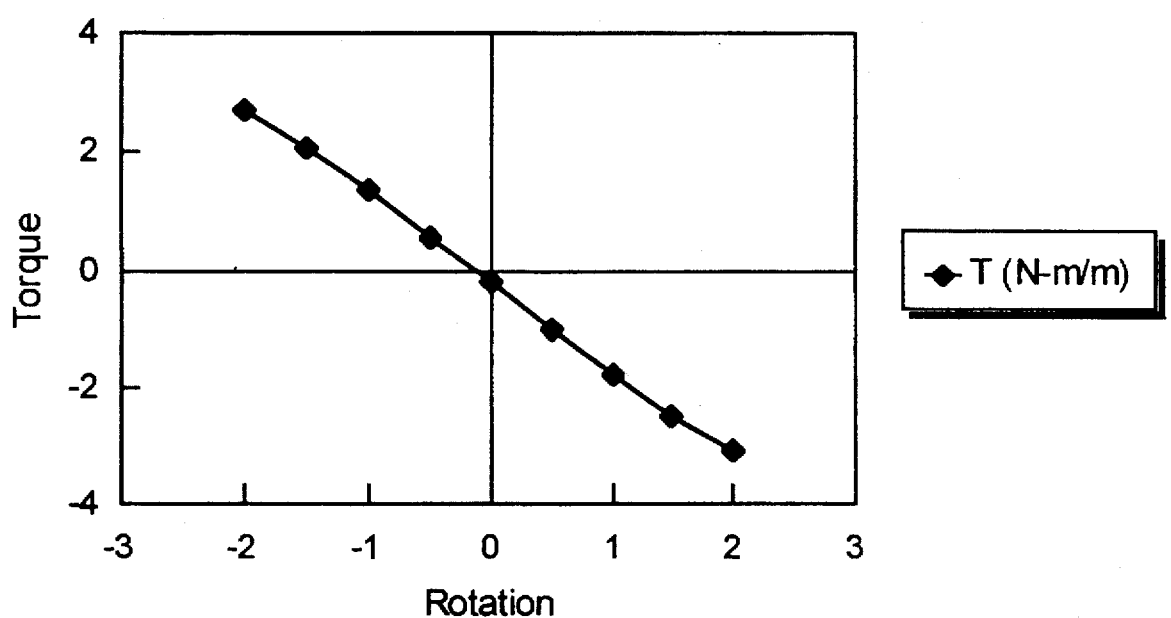

PASSIVE MAGNETIC BEARING SYSTEM

The present invention relates to the field of magnetic bearing or suspension systems. More specifically, the invention is directed towards a passive support system that relies only on the attractive and repulsive forces between permanently magnetized materials to attain stable equilibrium.

BACKGROUND OF THE INVENTION

Magnetic suspension systems are well known in the art. Such systems can be divided into two basic classes: active bearings and passive bearings. Active bearings use electromagnets that are controlled by a closed loop control or servo mechanism. Such systems require means to measure the position of the supported body and means of regulating the electric current in the electromagnets. They are, therefore, complex and costly systems.

Passive bearings in general use the attractive and repulsive forces of electromagnets or, preferably, permanently magnetized materials to generate support forces. No servo control or positioning measuring means are required. The passive bearings currently in use, however, are limited to one axis of stability, while the axes orthogonal to the stable axis are generally unstable. For example, in a rotatable configuration a passive bearing can be configured to be stable radially, but is then unstable axially. Conversely the bearing could be configured to be stable axially, but is then unstable radially. Linear bearings have similar stability limits.

One method of addressing this limitation is to use a mechanical bearing or an active magnetic bearing to stabilize and provide load support in the non-stable axis. This introduces the limitations of the mechanical or active magnetic bearing into the systems, respectively.

Another known method of addressing this problem is to construct bearings from conically shaped magnets. The unstable axis in this configuration is parallel to the surface of the cone, while the stable axis is perpendicular to the surface. Mechanical stability can be achieved for a limited range of cone angles. Unfortunately it is difficult and costly to manufacture conical magnets with the high magnetic energy required to produce useful bearing forces.

Yet another method of addressing the shortcoming is to rely on gyroscopic or eddy current forces to achieve dynamic stability. These types of systems are unstable in one or more axis when at rest, but become stable when the system rotational speed exceeds a certain critical value. These systems require mechanical bearings and/or active magnetic bearings to stabilize and provide load support below the critical rotational speed. This again introduces the limitations of the mechanical or active magnetic bearing into the systems.

BRIEF SUMMARY OF THE INVENTION

It is an object of the present invention to provide a passive magnetic bearing system comprised of permanently magnetized materials arranged such that the system is stable with respect to both radial and tilt displacements.

It is another object of the present invention to provide a passive magnetic bearing system comprised of permanently magnetized rings and disks of simple cross section, magnetized axially, and arranged such that the system is stable with respect to both radial and tilt displacements.

It is another object of the present invention to provide a passive magnetic linear bearing system comprised of permanently magnetized bars of simple cross section, magnetized through their thickness, and arranged such that the system is stable with respect to both radial and tilt displacements.

An apparatus to accomplish these purposes uses two magnetic assemblies, movable relative to each other and separated by a gap. The magnetic assemblies have a section in which permanent magnets act in direct opposition across the gap. The magnetic assemblies have an additional section in which the outer diameter (edge) of one permanent magnet is substantially aligned with the inner diameter (edge) of another permanent magnet located in the other assembly on the opposite side of the gap. Further, all permanent magnets located in any assembly share a common surface (plane or cylinder) next to the gap. Such passive magnetic bearing systems are useful in many applications including, but not limited to: pumps, motors, flywheels, computer disk drives, and generators.

BRIEF DESCRIPTION OF THE DRAWINGS

FIG. 2b is a graphical representation of the axial displacement force vs. distance for the embodiment shown in FIG. 2a.

FIG. 2c is a graphical representation of the radial displacement force vs. distance for the embodiment shown in FIG. 2a.

FIG. 2d is a graphical representation of the angular displacement torque vs. angular displacement for the embodiment shown in FIG. 2a.

FIG. 3b is a graphical representation of the axial displacement force vs. distance for the embodiment shown in FIG. 3a.

FIG. 3c is a graphical representation of the radial displacement force vs. distance for the embodiment shown in FIG. 3a.

FIG. 3d is a graphical representation of the torsional stiffness vs. angular displacement for the embodiment shown in FIG. 3a.

DETAILED DESCRIPTION OF THE INVENTION

Figure 1:
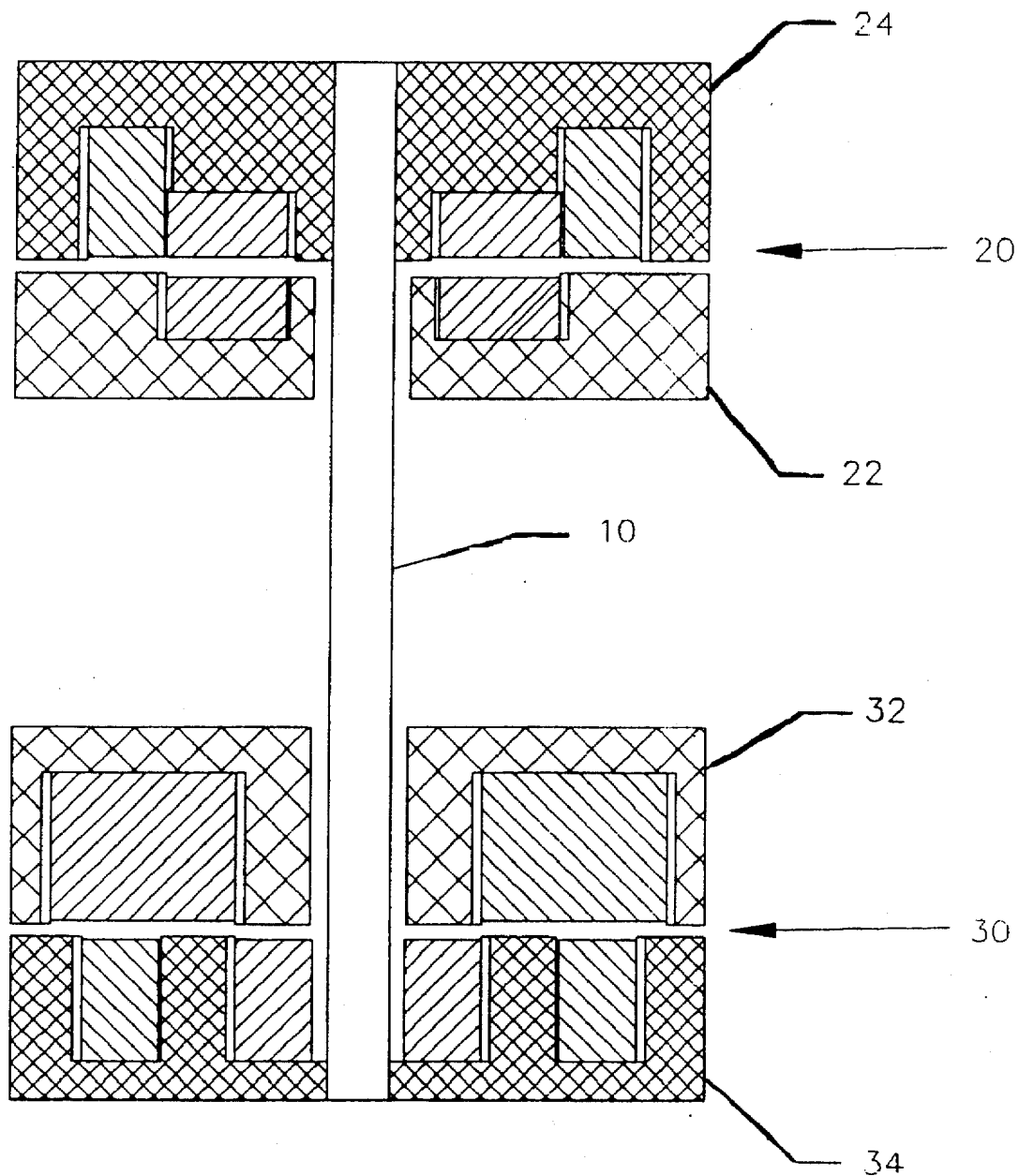
FIG. 1 is a cross sectional view of a rotatable system with a vertical axis of rotation, using my new bearing system.

Referring now to the drawings, FIG. 1 is a cross sectional view of a rotatable system with a vertical axis of rotation. The rotating member, or shaft, 10 is supported by an upper passive magnetic bearing element 20 and a lower passive magnetic bearing element 30. The upper passive magnetic bearing system 20 has a stationary assembly 22 and a rotating assembly 24. The lower passive magnetic bearing system 30 also has a stationary assembly 32 and a rotating assembly 34. These assemblies are shown in more detail in FIGS. 2a and 3a.

Figure 2A:
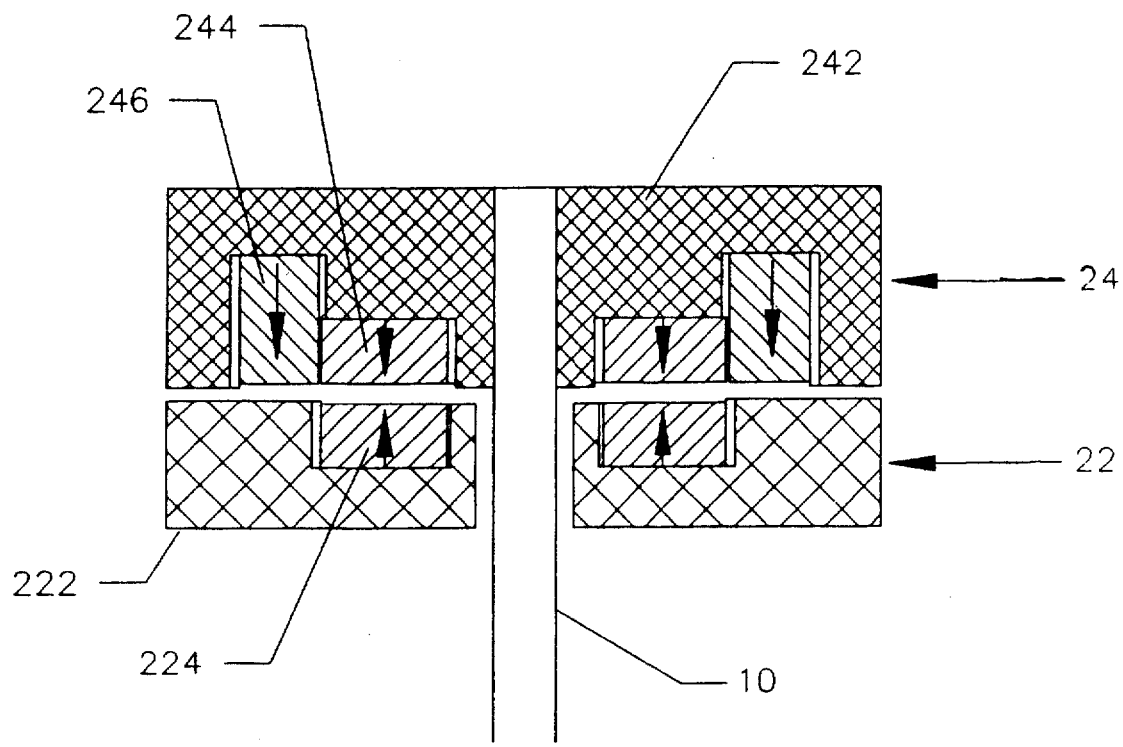
FIG. 2a is a detail view of one embodiment of a passive magnetic bearing element according to the present invention.

FIG. 2a is cross sectional view of the upper bearing system shown in FIG. 1. It represents one embodiment of the present invention. It has an upper assembly 24 and a lower assembly 22. In this figure, the upper assembly 24 is rotatably mounted on a shaft 10 while the lower assembly 22 is fixedly mounted by a means not shown. This arrangement could be symmetrically reversed with no adverse impact on the performance of the invention.

The upper assembly 24 also has a housing 242 and two ring-shaped permanent magnets 244 and 246. The direction of magnetization of the magnets is indicated by the arrows, but all magnets in both the upper and lower assembly could be reversed with no adverse impact on the performance of the invention.

The lower assembly 22 has a housing 222 and a ring-shaped permanent magnet 224. The direction of magnetization of the magnet is again indicated by the arrows.

In this embodiment the directly opposing magnets 224 and 244 provide an axial load capacity and a positive axial stiffness. Thus this pairing, taken by itself, provides stable support along the axis of rotation and tilt stability about the radial axes. This pairing, however, has a negative radial stiffness and is therefore unstable in the radial direction.

The interaction between the stationary magnet 224 and the offset rotatable magnet 246 provides positive radial load capacity and stiffness, while having a negative axial stiffness.

By combining the directly opposing 244 and offset 246 magnets in one housing 242 their interaction with the stationary magnet 224 can be combined. By appropriately selecting the magnet geometries and magnetic properties the net radial and tilt stiffnesses can be made to be positive. Further, by increasing the strength of the offset magnetic field, either by increasing the thickness of the magnets (as shown) or by increasing the offset magnet strength, or both, the radial stabilization effect of the offset magnet can be increased. This increase in radial stabilization, however, also decreases the axial stability of the assembly. A balance between these competing trends must be found for each bearing design, usually through computational analysis. Such analysis is best done on a commercially available Finite Element Analysis Program that has electromagnetic Analysis capabilities. Examples of such programs are COSMOS, produced by Structural Research and Analysis Corporation of Los Angeles Calif., MAXWELL, produced by Ansoft Corporation of Pittsburgh, Pa., and OPERA, produced by Vector Fields, Inc. of Aurora, Ill. Each of these programs uses Maxwell's equations to calculate the flux fields and interaction forces of magnets when they are supplied with the geometry and magnetic characteristics of the magnets. Thus, some iterative calculation using these programs is necessary to find the ideal magnet geometry for a given set of magnetic characteristics. These calculations focus on optimization of the key parameters of the magnetic design and not the basic design concept discussed herein. Thus, forming magnets having the structure shown herein produces a workable bearing system. To optimize that system, however, the elements discussed above may be adjusted using the programs mentioned above to produce the best overall result for each case.

The geometry shown in FIG. 2a achieves this balance by using equal strength magnets and by using offset magnets (224 and 244) that are twice as thick axially and two thirds as thick radially as the other magnets. For this configuration, the calculated assembly axial, radial, and torsional force vs. displacement can be graphically shown. These graphs are shown in FIGS. 2b, 2c, and 2d respectively. The negative slope of the line in these plots represents a positive stiffness while a positive slope respresents a negative stiffness. In these graphs, the x-axis represents the displacement away from the nominal bearing location. The y-axis represents the bearing force in the direction of the displacement.

Figure 2E:
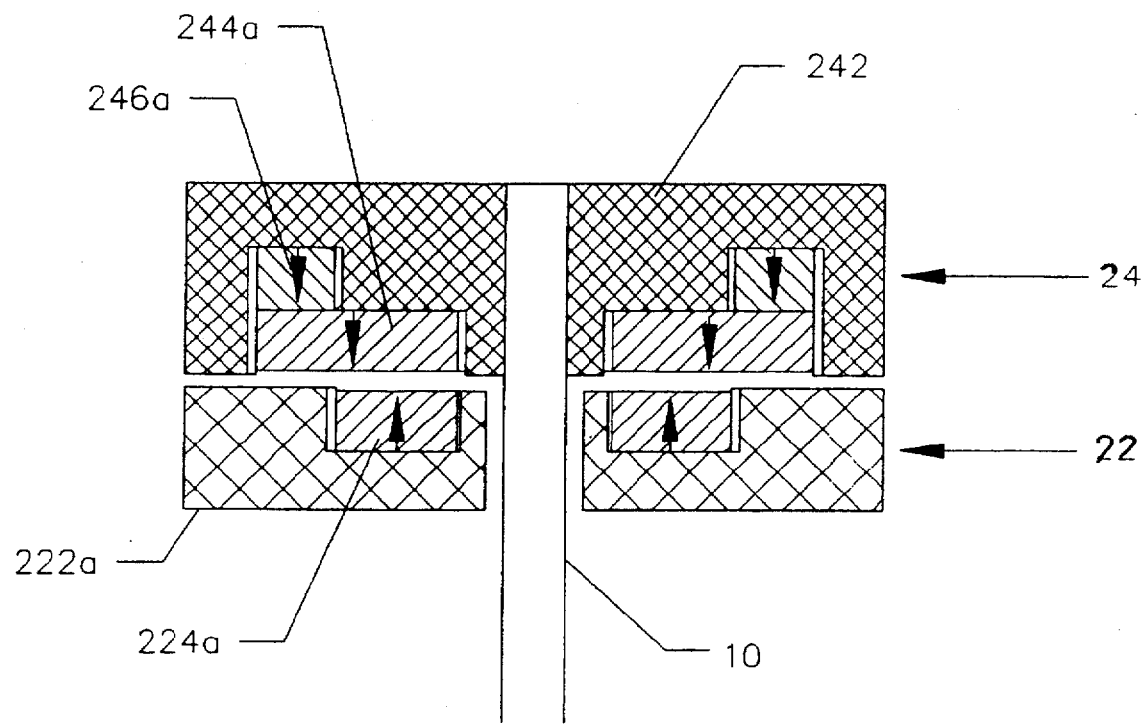
FIG. 2e is a cross-sectional view of a modification of the first embodiment.

FIG. 2e is a modification of this embodiment in which the offset portion of the magnetic circuit is formed in a different manner. It serves to illustrate that the equivalent magnetic configuration can be achieved by a number of actual magnet assemblies. The base feature of these assemblies is that there is a repulsive portion of the magnetic field interaction that provides stability in one (or more) axis (axes) and an attractive portion of the magnetic field interaction that provides stability in the orthogonal axes (axis).

Figure 3A:
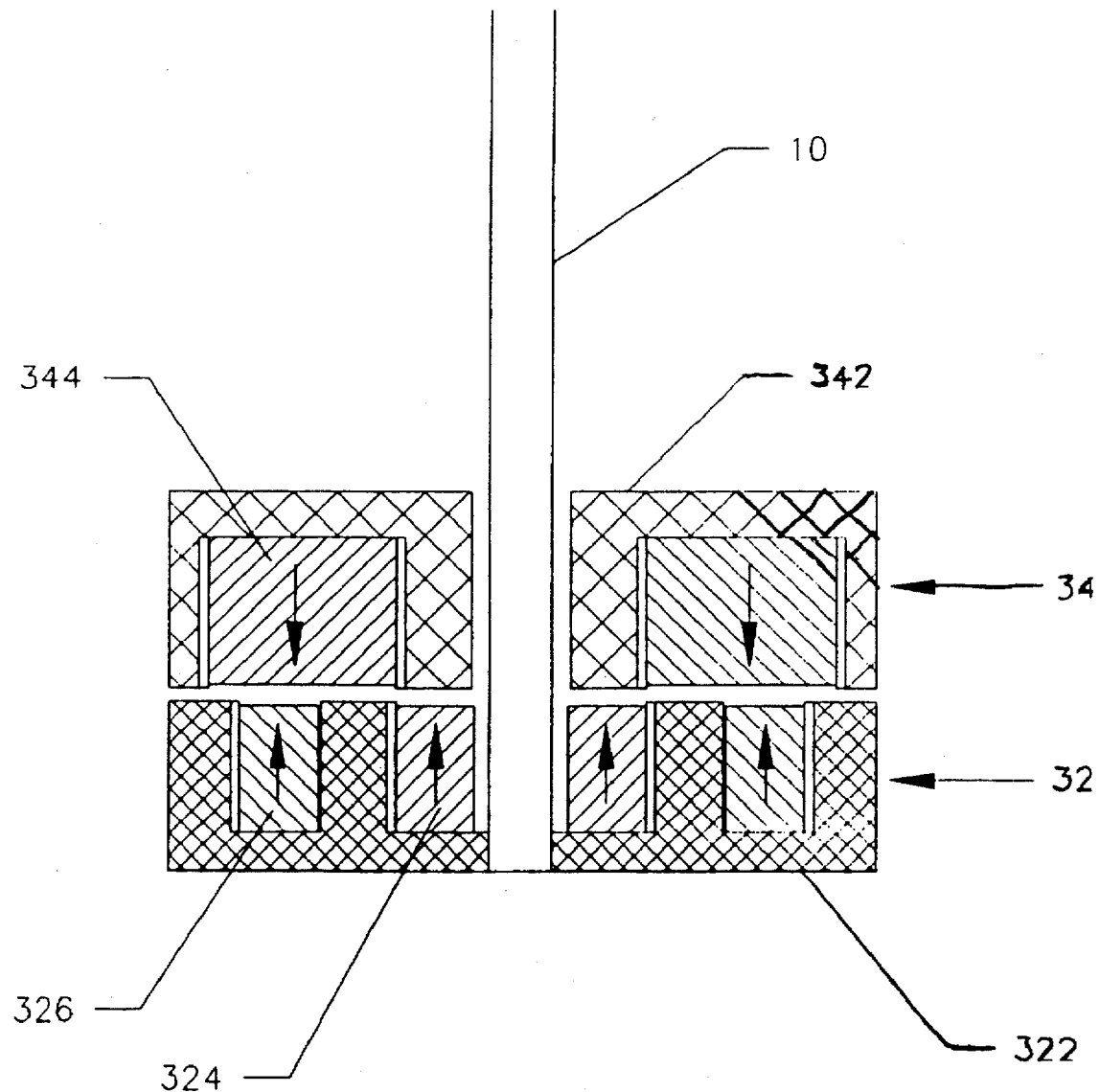
FIG. 3a is a detail view of a second embodiment of a passive magnetic bearing element according to the present invention.

FIG. 3a is an expanded cross sectional view of the lower bearing system shown in FIG. 1. It represents another embodiment of the present invention. It has an upper assembly 34 and a lower assembly 32. Here, the lower assembly 32 is rotatably mounted on a shaft 10 while the upper assembly 32 is fixedly mounted by a means not shown. This arrangement could be symmetrically reversed with no adverse impact on the performance of the invention.

The lower assembly 32 also has a housing 322 and two ring-shaped permanent magnets 324 and 326. The direction of magnetization of the magnets is indicated by the arrows, but the direction of magnetization of all magnets in both the upper and lower assembly could be reversed with no adverse impact on the performance of the invention.

The upper assembly 34 is similarly composed of a housing 342 and a ring-shaped permanent magnet 344. The direction of magnetization of the magnet is again indicated by the arrows.

In this embodiment the directly opposing magnets 326 and 344 provide an axial load capacity and a positive axial stiffness. Thus, this pairing, taken by itself, provides stable support along the axis of rotation and tilt stability about the radial axes. This pairing, however, has a negative radial stiffness and is therefore unstable in the radial direction. Conversely, the interaction between the stationary magnet 344 and the offset rotatable magnet 324 provides positive radial load capacity and stiffness, while having a negative axial stiffness.

By combining the directly opposing 326 and offset 324 magnets in one housing 322 their interaction with the stationary magnet 344 can be combined. In this embodiment the balance is achieved in a slightly different way. Here the strength of the offset and the opposing magnets is equal. By increasing the radial thickness of the stationary magnet 344 the radially destabilizing effects of the opposing magnet 326 is decreased. Further, by partially offsetting the opposing magnet 326 centerline from the stationary magnet 344 centerline, the radial destabilizing effects can be further reduced. It has been found that a 10% offset between centerlines produces a minimum radial destabilization for the relative magnet sizes shown in FIG. 3a, in which the stationary magnet's radial thickness is approximately twice that of the rotating magnets (326 and 324). This figure illustrates another aspect of the current invention. The relative coercive strengths of all magnets has been kept approximately equal by using a lower grade, but thicker magnet for the stationary portion of the circuit. In this configuration the stationary magnet 344 is approximately 15% thicker than the rotating magnets 326 and 324, but also is made from a material with a coercivity that is approximately 15% less than the rotating magnets 326 and 324. For this configuration, the calculated assembly axial, radial, and torsional force vs. displacement can be graphically shown.

These graphs are shown in FIGS. 3b, 3c, and 3d respectively. The negative slope of the line in each plot represents a positive stiffness while a positive slope indicates a negative stiffness. In these graphs, both the x-axis and y-axis represent the same terms as those of FIGS. 2b–2d.

There are many variables that can be adjusted to modify the radial and axial stiffness of the assembly. The axial dimension of the various magnets can be adjusted as demonstrated in FIGS. 2a and 3a. The ratios of the radial thicknesses of the opposing and offset magnets can also be adjusted. When the ratio of the radial thicknesses of the opposing magnets is different from 1.0, the offset between the opposing magnets centerlines can be adjusted. Additionally, magnets of different energy products, coercive strengths, and residual flux densities may be used, as is illustrated in FIG. 3a.

Figure 4:
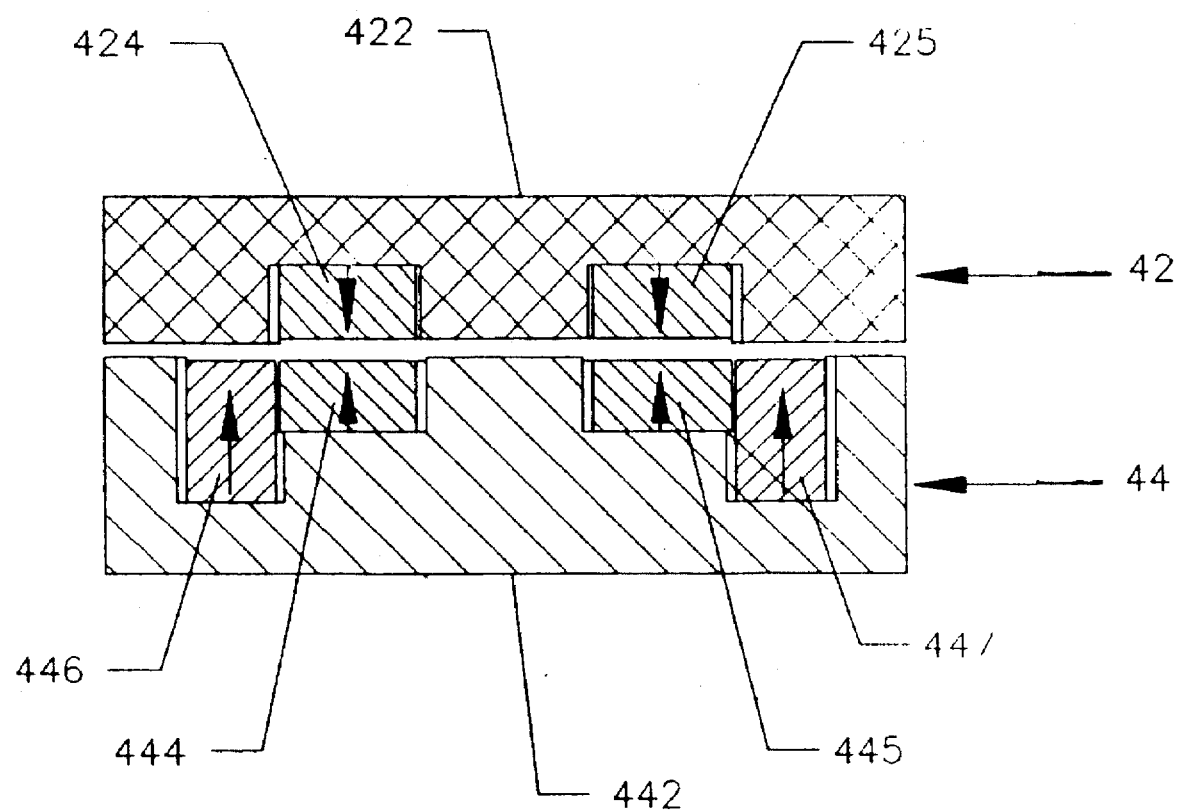
FIG. 4 is a detail view of the embodiment of FIG. 2 used in a linear bearing system.

FIG. 4 is a cross sectional view of a modification of the embodiment shown if FIG. 2a to a linear bearing application. A movable assembly 42 is positioned above a stationary assembly 44. The movable assembly is composed of a housing 422 and two bar magnets 424 and 425 magnetized through their thickness. The direction of magnetization is indicated by arrows. Again, all magnetization directions, in both the moving and stationary magnets could be reversed without impacting the performance of the device. The stationary assembly 44 is composed of a housing 442 and four bar-shaped magnets 444, 445, 446, and 447. These magnets are arranged in pair with pair 444 and 445 opposing the movable magnets 424 and 425 while pair 446 and 447 are offset from the movable magnets.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A magnetic bearing system comprising:

a) at least one rotatable member;

b) a magnetic means for supporting said rotatable member wherein said magnetic means further stabilizes said rotating member and wherein said magnetic means includes i) at least one stationary magnetic assembly, ii) and at least one rotatable magnetic assembly, and further such that the stationary magnetic assembly and the rotatable magnetic assembly are configured such that one portion of the stationary magnetic assembly and one portion of the rotatable magnetic assembly interact in repulsion, to provide stabilizing forces and mechanical stiffness in a first axis, and whereby a second portion of the stationary magnetic assembly and a second portion of the rotatable magnetic assembly interacts in attraction, providing stabilizing forces and mechanical stiffness in an axis orthogonal to said first axis;

c) and further wherein the portion of the stationary magnetic assembly and the portion of the rotatable magnetic assembly that interacts in attraction comprise a stationary ring of magnetic material and a rotating ring of magnetic material, wherein the stationary ring of magnetic material has a magnetic field and the rotating ring of magnetic material has a magnetic field;

d) and further wherein the magnetic fields of the stationary ring of magnetic material and the rotating ring of magnetic material are in substantially opposite disposition;

e) and further wherein the stationary ring of magnetic material has an outer surface formed by a diameter of the stationary ring of magnetic material and an inner surface formed by a diameter of the stationary ring of magnetic material, and the rotating ring of magnetic material has an outer surface formed by a diameter of the rotating ring of magnetic material and an inner surface formed by a diameter of the rotating ring of magnetic material, and further such that the outer surface of one ring of magnetic material is substantially aligned with the inner surface of the second ring of magnetic material.

2. The magnetic bearing system of claim 1 wherein the portion of the stationary magnetic assembly and the portion of the rotatable magnetic assembly that interact in repulsion comprise a stationary ring of magnetic material and a rotating ring of magnetic material; wherein the stationary ring of magnetic material has a magnetic field and the rotating ring of magnetic material has a magnetic field.

3. The magnetic bearing system of claim 2 wherein the magnetic fields of the stationary ring of magnetic material and the rotating ring of magnetic material are in substantially opposite disposition.

4. The magnetic bearing system of claim 2 wherein the stationary ring of magnetic material and the rotating ring of magnetic material have the same diameter.

5. The magnetic bearing system of claim 1 wherein the sum of the mechanical stiffnesses from all of the magnetic materials is positive for the first axis and is also positive for the axis orthogonal to said first axis.

6. A magnetic bearing system comprising:

a) at least one rotatable member;

b) at least one stationary magnetic assembly, said stationary magnetic assembly having an outer housing and a having a magnetic mass, fixedly installed within said outer housing, said magnetic mass of the stationary magnetic assembly including a stationary ring of magnetic material and further wherein the stationary ring of magnetic material has an outer surface formed by a diameter of the stationary ring of magnetic material, and further wherein the ring of magnetic material of said first rotating magnetic mass has an inner surface formed by a inside diameter of the ring of magnetic material of said first rotating magnetic mass, and further such that the outer surface of the stationary ring of magnetic material is substantially aligned with the inner surface formed of the ring of magnetic material of said first rotating magnetic mass;

c) at least one rotatable magnetic assembly, having a outer housing and a first magnetic mass and a second magnetic mass, fixedly installed therein, whereby the stationary magnetic assembly and the rotatable magnetic assembly are configured such that magnetic mass of the stationary magnetic assembly and the first magnetic mass of the rotatable magnetic assembly interact in repulsion, to provide stabilizing forces and mechanical stiffness in a first axis, and whereby the magnetic mass of the stationary magnetic assembly and the second magnetic mass of the rotatable magnetic assembly interacts in attraction, providing stabilizing forces and mechanical stiffness in an axis orthogonal to said first axis.

7. The magnetic bearing system of claim 6 wherein the first and second magnetic masses of the rotating magnetic assembly comprise rings of magnetic material.

8. A magnetic bearing system comprising:

a) a fixed member;

b) a slidable member, positioned relative to said fixed member;

c) a magnetic means for supporting said slidable member in a relation to said fixed member, wherein said magnetic means further stabilizes said slidable member and wherein said magnetic means includes i) at least one stationary magnetic assembly, ii) and at least one slidable magnetic assembly, and further such that the stationary magnetic assembly and the slidable magnetic assembly are configured such that one portion of the stationary magnetic assembly and one portion of the slidable magnetic assembly interact in repulsion, to provide stabilizing forces and mechanical stiffness in a first axis, and whereby a second portion of the stationary magnetic assembly and a second portion of the slidable magnetic assembly interacts in attraction, providing stabilizing forces and mechanical stiffness in an axis orthogonal to said first axis;

d) and further wherein the portion of the stationary magnetic assembly and the portion of the slidable magnetic assembly that interact in attraction comprise a stationary bar of magnetic material and a siding bar of magnetic material;

e) wherein the stationary bar of magnetic material has a magnetic field and the siding bar of magnetic material has a magnetic field and further wherein the stationary bar of magnetic material has an outer surface and an inner surface, and the siding bar of magnetic material has an outer surface and an inner surface, and further such that the outer surface formed of one bar is substantially aligned with the inner surface of the second bar.

9. The magnetic bearing system of claim 8 wherein the magnetic fields of the stationary bar of magnetic material and the siding bar of magnetic material are in substantially opposite disposition.

10. The magnetic bearing system of claim 8 wherein the portion of the stationary magnetic assembly and the portion of the slidable magnetic assembly that interact in repulsion comprise a stationary bar of magnetic material and a siding bar of magnetic material; wherein the stationary bar of magnetic material has a magnetic field and the siding bar of magnetic material has a magnetic field.

11. The magnetic bearing system of claim 10 wherein the magnetic fields of the stationary bar of magnetic material and the siding bar of magnetic material are in substantially opposite disposition.

12. The magnetic bearing system of claim 10 wherein the stationary bar of magnetic material and the siding bar of magnetic material have the same width.

* * * * *